United States Patent [19]
Rauchwerger

[11] Patent Number: 5,743,287
[45] Date of Patent: Apr. 28, 1998

[54] AUTOMATIC POOL CHLORINATOR

[76] Inventor: George P. Rauchwerger, 147 Cromart Ct., Sunnyvale, Calif. 94087

[21] Appl. No.: 627,901

[22] Filed: Apr. 3, 1996

[51] Int. Cl.$^6$ ........................................................ B01D 11/02
[52] U.S. Cl. ............................ 137/268; 422/278; 422/282
[58] Field of Search ........................... 137/268; 422/282, 422/264, 265, 261, 278, 281; 239/310

[56] References Cited

U.S. PATENT DOCUMENTS

| | | | |
|---|---|---|---|
| 4,188,295 | 2/1980 | Burnett. | |
| 4,691,732 | 9/1987 | Johnson et al. | |
| 4,995,418 | 2/1991 | Cervola | 137/268 |
| 5,010,912 | 4/1991 | Riding | 137/268 |
| 5,053,206 | 10/1991 | Maglio et al. | |
| 5,076,315 | 12/1991 | King. | |
| 5,133,381 | 7/1992 | Wood et al. | 137/268 |
| 5,225,074 | 7/1993 | Moini. | |

*Primary Examiner*—Kevin Lee
*Attorney, Agent, or Firm*—Francis H. Lewis

[57] ABSTRACT

A swimming pool chlorinator has a flow pipe that is removably attached to the inlet jet pipe from the pool circulation system and a container for chlorine-containing tablets that is located above the flow pipe. The chlorinator is submerged and the container has an opening to allow water from the pool to flow into the container and dissolve the tablets. A duct from the bottom of the container leads to the interior of the flow pipe. The duct extends into the flow pipe to constrict the flow through the pipe, so that this flow causes chlorinated solution to be aspirated from the container into the flow by means of the Venturi effect. The container is transparent so that the chlorine tablets are visible from outside the container. The container further has a removable lid for refilling the container. The container opening comprises a slotted hole in the lid, with a sliding plate that can be moved over this slot to vary the size of the opening and thereby regulate the flow through the container. The flow pipe has a knurled end that is inserted in the inlet jet pipe, so that the inlet jet pipe supports the chlorinator and the entire assembly may be removed from the pool for refilling.

18 Claims, 5 Drawing Sheets

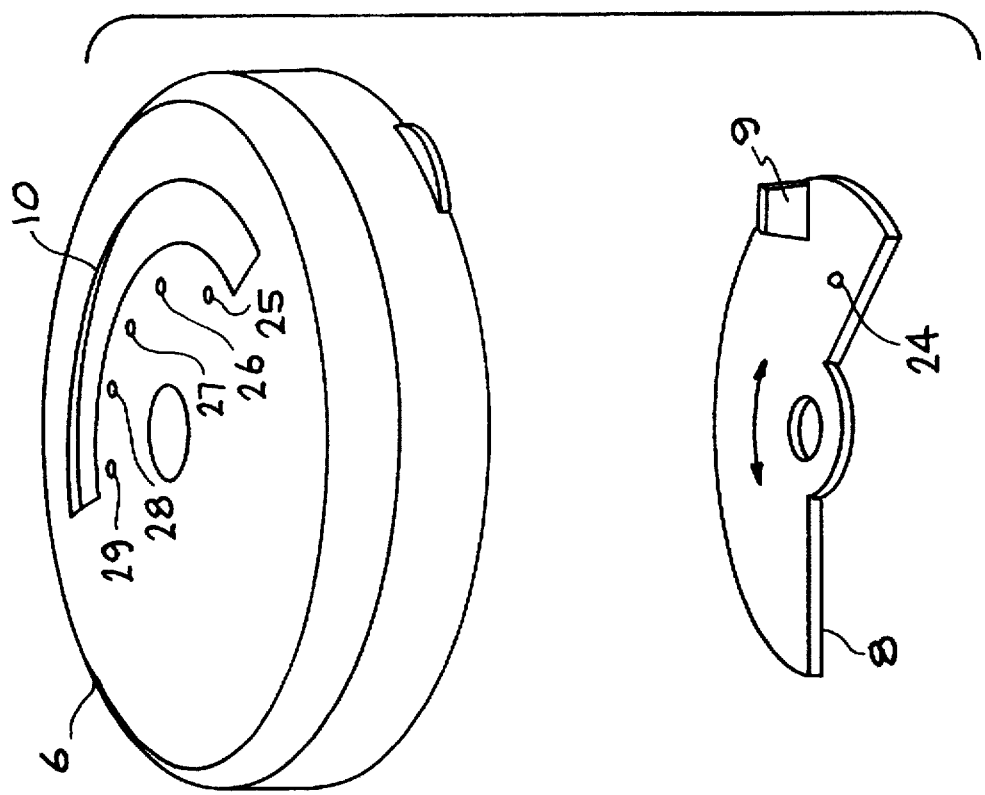
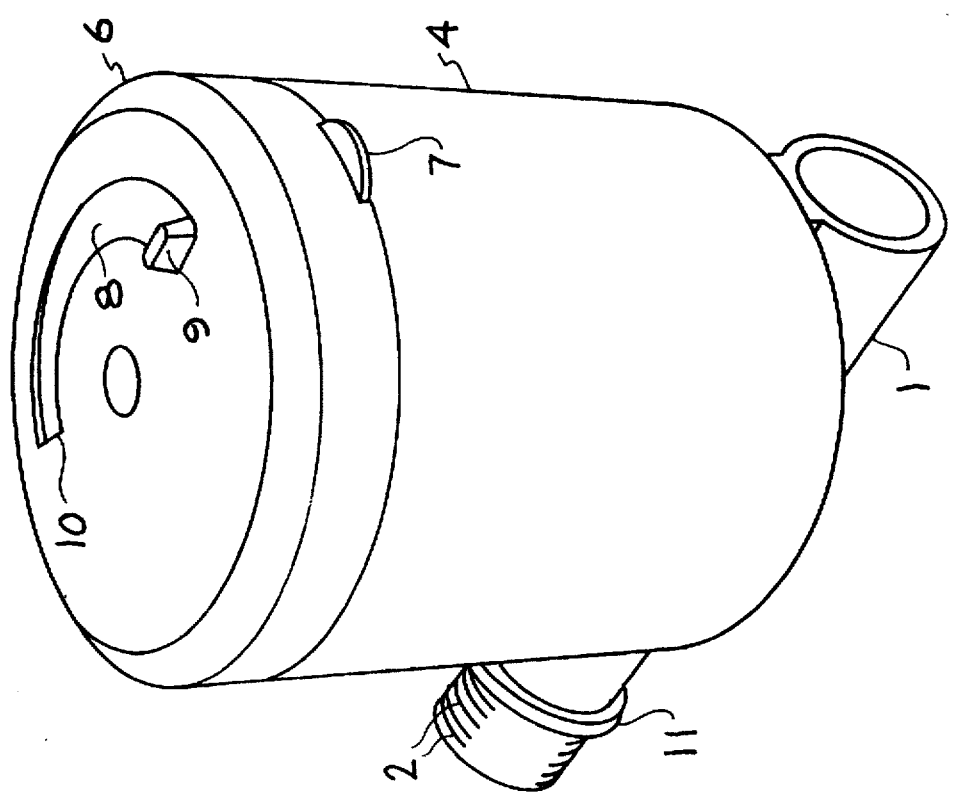
FIG. 6
FIG. 5

AUTOMATIC POOL CHLORINATOR

BACKGROUND OF THE INVENTION

1. Field of the Invention

This invention pertains generally to systems for introducing chemicals into pools of liquids, and more particularly to automatic chlorination systems for swimming pools, spas, and other pools of chlorinated water.

2. Description of the Background Art

Present-day systems for chlorinating swimming pools are designed to automatically maintain the chlorine level in the pool at a specified concentration. There are several varieties of these systems. One type of chlorinator provides a floating dispenser for chlorinating chemicals, which gradually releases a chlorine-containing substance into the pool as it floats on the surface. The resulting chlorine concentration from this type of chlorinator is generally substantially greater near the dispenser than in other regions of the pool. With such systems it is difficult to maintain overall control of the chlorine level. Another problem with a floating pool dispenser is that it is often not easy to tell when the dispenser is running out of chlorine-supplying chemical.

In other typical systems, the chlorinator is integrated with the water circulation, heating and filtration systems, and provides means for injecting controlled amounts of chlorinating solute chemicals into the circulating water and achieving a more uniform distribution of chlorine throughout the pool. The chemicals are often solid tablets or sticks of chlorine-containing salts. The system may allow a stream of circulating water to flow over the surfaces of these sticks or tablets and cause these chemicals to gradually dissolve in the stream. The chlorine concentration is regulated by controlling the flow rate of circulating water past the chlorine sticks or tablets. Alternatively the chlorine concentration may be controlled by gradually adding discrete amounts of solute, such as single tablets, to the water stream and monitoring the resulting chlorine level. In some systems the chlorinating solute is introduced directly into the water flow stream passing through the pump, filter and heater ("in-line" systems). Alternative systems provide a parallel by-pass flow path for adding the chlorinating solute ("off-line" systems).

When the chlorination material is injected directly into the water circulation system, a further problem arises from the acids produced by dissolving these chlorine-containing chemicals in water, since the acidic concentration is higher near the point where the chlorine material is introduced. Thus chlorinators of this type tend to produce corrosion and deterioration of the circulation system components such as the pump, plumbing, and filters. This drawback affects the effectiveness of such chlorination systems, because it requires that the chlorine solutes be released only in small amounts in order to minimize the damage to the circulation system components.

U.S. Pat. No. 4,188,295, issued Feb. 12, 1980 to W. R. Burnett, discloses a chlorinator and filter for treating water in a swimming pool. This system is designed for use only during the initial filling of the pool, and does not maintain the chlorine level subsequently. Also, this system tends to produce deterioration in the filter, as discussed above.

U.S. Pat. No. 5,053,206, issued Oct. 1, 1991 to M. W. Maglio et al., describes a device for dispensing a chemical solution into a pipeline transporting a pressurized liquid. This dispenser is directed primarily to pressurized fluid-handling systems.

A dispersal valve and canister are disclosed in U.S. Pat. No. 5,053,206, issued Dec. 31, 1991 to J. A. King. The canister contains pellets or tablets of dispersant material with a dispersal valve that introduces dispersant into the solvent liquid. The canister has an indicator to show when the dispersant material is substantially exhausted.

U.S. Pat. No. 4,691,732, issued Sep. 8, 1987 to B. R. Johnson et al., discloses a pool chlorinator for dispensing a stack of chlorine tablets into a pool circulation system. This device diverts a small part of the circulation water into a chamber containing the stack to dissolve a small portion of the tablet material, and then directs the chlorinated water back into the circulation stream.

U.S. Pat. No. 5,225,074, issued Jul. 6, 1993 to S. Moini, is directed to an automatic swimming pool chlorinator having a submerged canister containing chlorine tablets or sticks. The chlorinator is mounted between sections of the water hose suction line leading from a pool cleaner unit to a pool skimmer, or alternatively, it may be mounted directly to a water recirculation return line at the side of the pool.

These devices suffer from one or more of the drawbacks discussed above, as well as other disadvantages. There is a need for a simpler and more efficient and convenient pool chlorinator. It is desirable to provide means for controlling the rate at which chlorinating material is dispersed into the pool water, and for distributing the chlorine uniformly. Preferably the chlorinator should provide means for determining the amount of chlorinating material in the device, and for easily refilling the system. Additionally, it is desirable to avoid corrosion and deterioration of the pool circulation system components from the chlorinating material.

SUMMARY OF THE INVENTION

The present invention is a chlorinator for swimming pools, spas, and other pools requiring chlorinated water, that provides a container for solid chlorinating material, such as tablets of chlorine-containing salts, that can be attached to the water inlet jet, which is the return jet that delivers water from the water pump into the pool and is located normally below the pool surface. The container is preferably fabricated from clear plastic material and is located over the inlet, and since the inlet jet is normally near the water surface, the contents of the container are easily visible.

The chlorinator provides a flow pipe which is adapted at one end to be removably fastened to the inlet jet, so that the water entering the pool through this jet passes through this flow pipe. The interior of the flow pipe has an aperture with a duct leading to the container that is located immediately above the flow pipe at this aperture. The duct extends partially into the flow pipe to constrict the water flow at the aperture, so that water is aspirated from the container into the flow stream at this aperture by means of the Venturi effect.

The container has a lid with an opening to allow pool water to enter the top of the container and flow past the chlorine tablets, and to exit the container through the aperture at the bottom into the water flow stream. The interior of the container is provided with ribs and spacers to hold the tablets, to allow water in the container to flow past the tablets and gradually dissolve the chlorine tablet material. The lid opening has a swivel cover that can be adjusted to vary the size of the opening, in order to regulate the water flow through the container. The container lid may be opened to allow the container to be refilled with chlorine tablets. The entire chlorinator fixture can be removed from the inlet water jet.

It is an object of this invention to provide a chlorinator for pools that injects chlorinating material into the inlet jet water stream from the pump into the pool.

A second object of the invention is to provide a pool chlorinator that is constructed and disposed such that the chlorinating material is visually observable, to enable the user to easily determine when the supply of chlorinating material needs replenishment.

A third object of the invention is to provide a pool chlorinator which may be easily detached from the water circulation system.

Another object of the invention is to provide a pool chlorinator having a lid which may be opened easily to facilitate the replenishment of chlorinating material.

Yet another object of the invention is to provide a pool chlorinator in which the injection rate of chlorinating material into the pool may be easily adjusted and regulated.

A further object of the invention is to provide a pool chlorinator that is simple and inexpensive in design, and efficient and easy to use.

These and other objects, advantages, characteristics and features of the invention may be better understood by examining the following drawings together with the detailed description of the preferred embodiments.

BRIEF DESCRIPTION OF THE DRAWINGS

FIG. 5 illustrates a perspective view of the chlorinator shown in FIG. 1.

FIG. 6 is an exploded view of the lid and cover of a modified version of the chlorinator of FIG. 1.

DETAILED DESCRIPTION OF THE PREFERRED EMBODIMENTS

Figure 1:
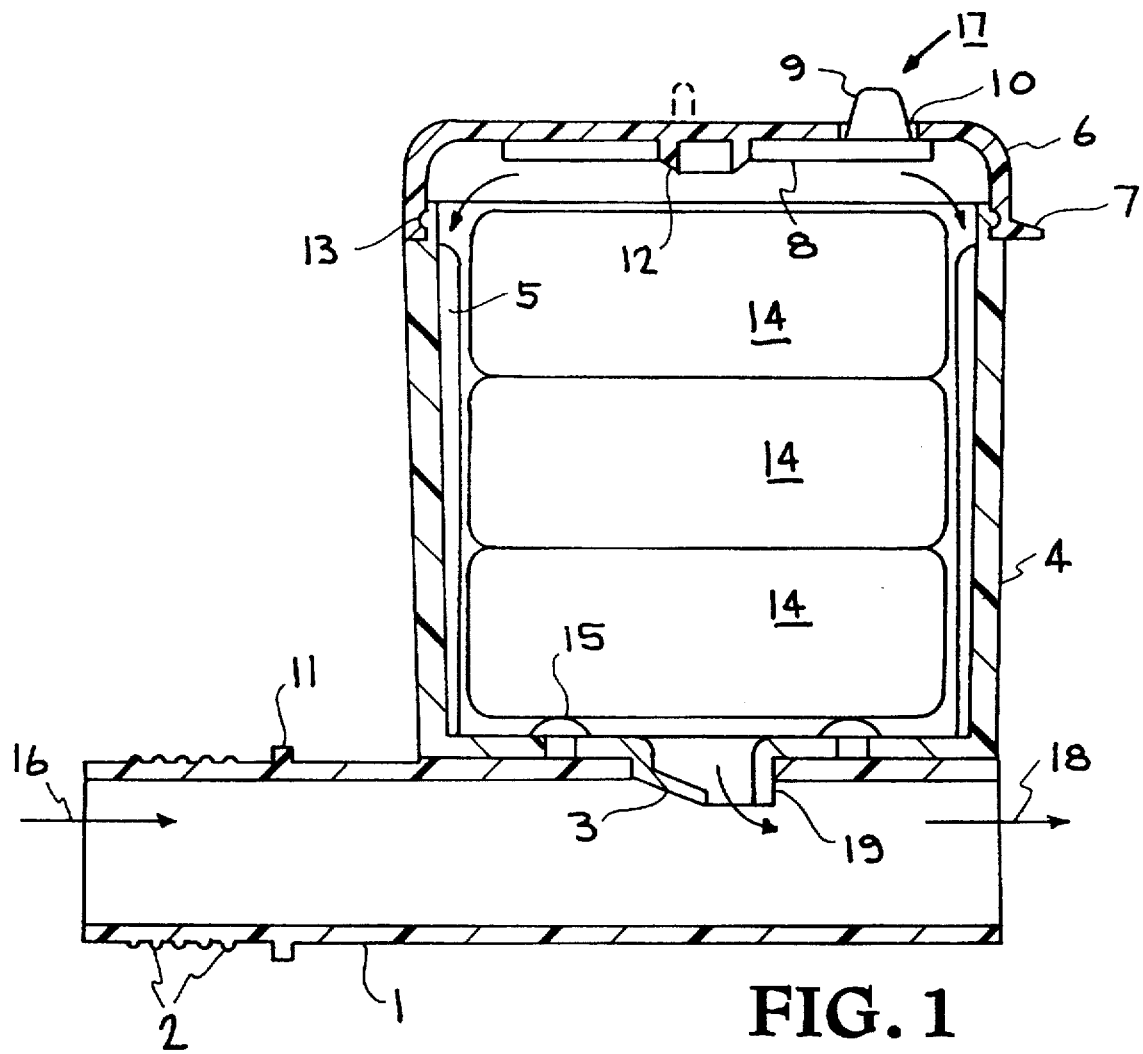
FIG. 1 is a cross sectional elevation view of the chlorinator of the present invention, where the central axis of the chlorinating-material container and the axis of the flow pipe both lie in the vertical sectional plane.

FIG. 1 shows a cross sectional view of a chlorinator according to the present invention, having a flow pipe 1 which is removably attached to the water inlet jet of a pool such that the inlet flow passes through the pipe. In this Figure, the arrows denoted by reference numerals 16, 18 show the direction of the flow through this pipe 1. In the embodiment of FIG. 1, the inlet end of the pipe 1 is knurled; that is, the exterior surface at the end of the pipe is provided with a series of molded ribs or ridges 2. This inlet end is also provided with a collar 11 adjacent to the knurled portion of the flow pipe 1. The flow pipe 1 is attached to the water inlet jet pipe by inserting the knurled end 2 of the flow pipe 1 into the water inlet jet pipe up to the collar 11. The knurled end 2 engages the interior of this pipe with a snug friction fit, so that substantially the entire water stream from the jet is directed through the flow pipe 1, and the whole chlorinator assembly is locked in place and supported by the water inlet jet pipe. The knurled end 2 of the flow pipe 1 also allows the entire assembly to be removed for purposes of cleaning and repairing.

The flow pipe 1 has an upwardly disposed opening defined by a duct 19 which extends downward a short distance into the interior of the flow pipe 1. This duct 19 passes through the bottom of a container 4 for chlorinating material, located over the flow pipe 1, so that the flow pipe 1 is hydraulically connected to the interior of the container 4. The upstream surface 3 of the duct portion 19 inside the flow pipe 1 is a planar surface that is oblique to the axes of the flow pipe 1 and the duct 19, so that the flow denoted by the arrows 16, 18 in FIG. 1 is constricted in the region of the duct 19 without generating appreciable turbulence. The oblique surface 3 is typically oriented at an angle of approximately 15 degrees relative to the horizontal orientation. The constricted flow aspirates water from the interior of the container 4 through the duct 19 into the flow stream 18 by means of the well-known Venturi effect.

The top of the container 4 has a lid 6 with an outwardly projecting handle 7. The container 4 is preferably cylindrical and the lid 6 is preferably circular, as shown in the top view of the chlorinator illustrated in FIG. 2. The edge of the lid projects downward and fits snugly around the upper rim of the container 4. The rim has a ridge which extends entirely around its circumference and fits into a groove 13 extending entirely around the inner edge of the lid 6 to hold the lid 6 in place. Thus, the lid 6 may be fastened to the container 4 by pressing the lid 6 downward to flex the lid slightly so that the ridge snaps into the groove 13. The lid 6 is removed from the container 4 by pulling upward on the lid handle 7, shown in both FIGS. 1 and 2. The container 4 and the lid 6 are preferably fabricated from clear plastic or other transparent material, so that the contents are easily visible from the outside.

Figure 2:
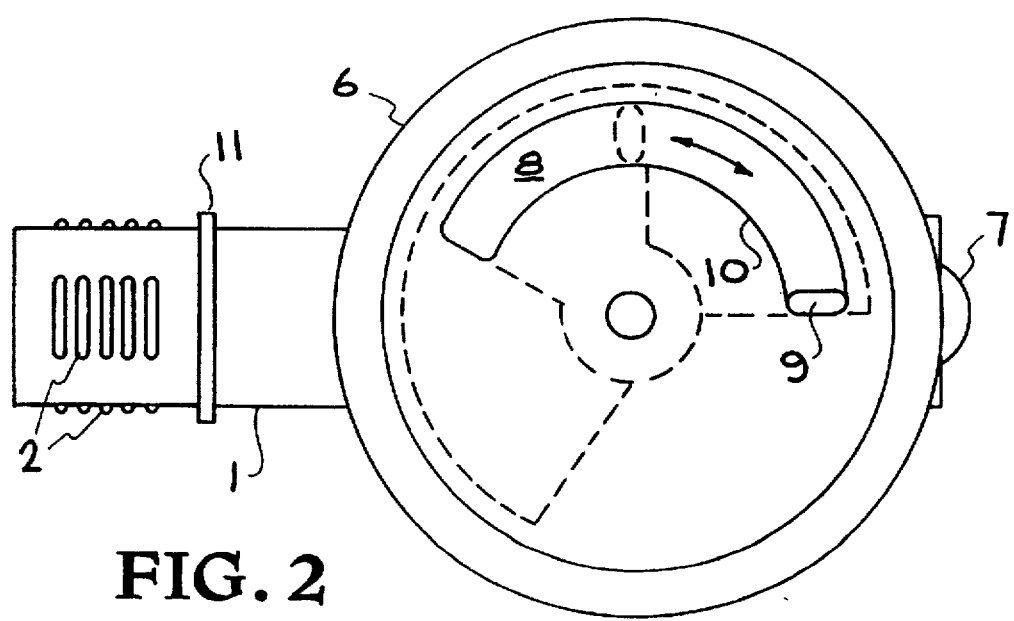
FIG. 2 is a top view of the chlorinator shown in FIG. 1, showing the swivel cover for the container lid in the closed position, with dotted lines showing this cover in a partially open position.

Still referring to FIGS. 1 and 2, the lid 6 is provided with an opening 10. This opening 10 is a slot through the lid 6 having the shape of a circular arc about the center of the lid 6. When the chlorinator is in use, with the flow pipe 1 attached to the water inlet jet pipe in a pool, the entire assembly is submerged so that a water stream 17 enters the container 4 through this opening 10. As described above, water is drawn out of the container 4 through the duct 19 in the bottom. Thus, the aspirating effect of the stream in the flow pipe 1 causes a continuous flow of water downward through the container 4.

The chlorinating material is shown in FIG. 1 as a stack of tablets 14 that fit inside the container 4. The chlorinating material in these tablets is preferably a water soluble salt such as sodium trichloro-s-triazine. The interior of the container 4 is provided with a plurality of ribs 5 along the sides and spacers 15 on the bottom of the container 4 that serve to hold the tablets 14 away from the container walls and allow water to flow freely through the container 4 past the surfaces of the tablets 14. The continuous water flow causes the tablets 14 to gradually dissolve, thereby injecting chlorine into the water stream 18.

Referring again to FIGS. 1 and 2, the lid 6 is further provided with a swivel cover 8 that can be adjusted to vary the size of the opening 10. This cover 8 is a flat plate structure located on the underside of the lid 6, and having the approximate shape of a circular sector. The cover 8 is fastened to the lid 6 by means of a swivel fastener 12 at the center of the lid 6, and the cover 8 further includes a knob or handle 9 extending upward through the slotted lid opening 10. The cover 8 can be rotated in slidable contact with the undersurface of the lid 6 about the swivel fastener 12. This rotation is carried out by moving the knob 9 along the arc formed by the slotted opening 10; the position of the cover 8 is thus determined by the location of the knob 9 along this arc. The cover 8 is sufficiently large to extend over the entire opening 10, so that in the closed position the opening 10 is completely covered. The position of the knob 9 when the cover 8 is closed is indicated by the knob drawn in solid lines in FIGS. 1 and 2. The dotted line knob illustrated in these Figures indicates a partially open cover position.

The flow rate of the stream 17 is controlled by adjusting the position of the knob 9 to vary the effective size of the opening through which the stream 17 flows. The swivel fastener holds the cover 8 snugly against the underside of the lid 6, so that when the position of the cover 8 is set manually it is held in this position by friction and does not become dislodged by the water flow.

In an alternative version of the invention, the lid and cover are provided with a detent mechanism to hold the cover 8 in place. FIG. 6 shows an exploded view of the modified lid 6 and cover 8. The cover 8 has a nub or projection 24 disposed on the upper surface of the cover 8, and the lid has a series of small holes, 25, 26, 27, 28 and 29, or alternatively recesses, located at different angular positions and the same distance from the axis of the lid 6 and cover 8 as the nub 24. This nub or projection 24 may engage any one of the holes 25-29 to hold the cover 8 in a fixed angular position. When the nub 24 engages the hole 24 of FIG. 6, the cover is in the completely closed position. For the fully open position the nub 24 engages the hole 29. Thus in the embodiment illustrated in FIG. 6, the swivel cover 8 can be set to five different angular orientations, corresponding to five different sizes of aperture for the water stream 17.

Figure 3:
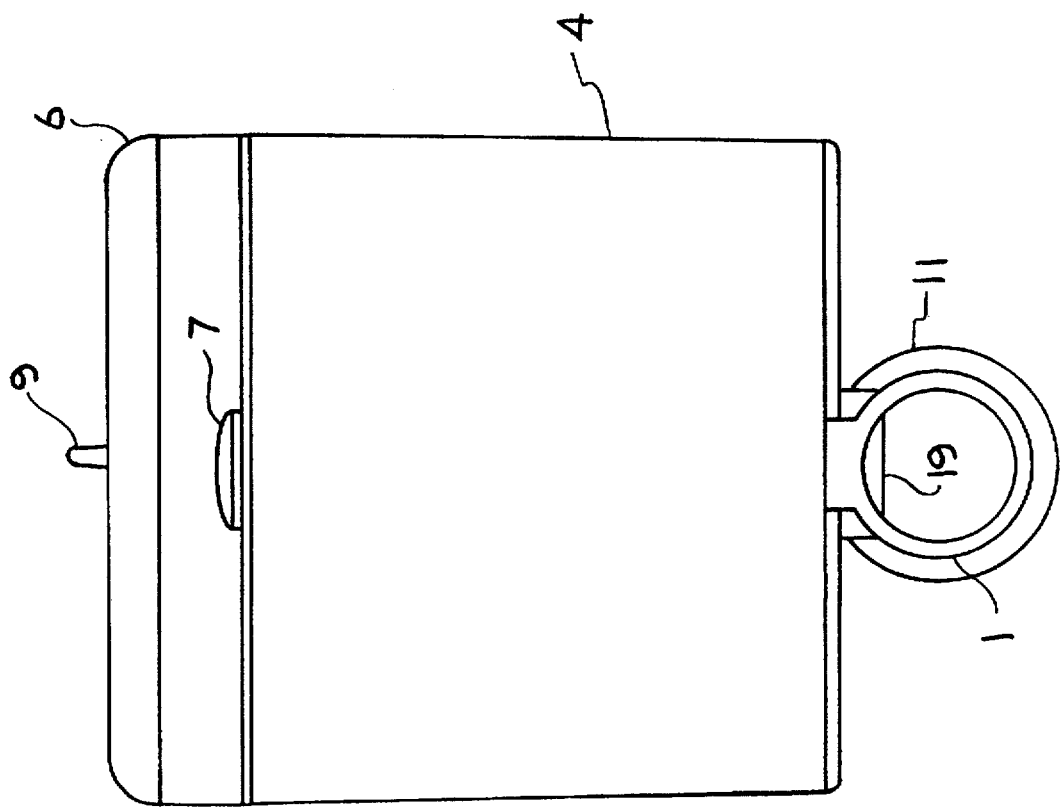
FIG. 3 is an elevation end view of the chlorinator, viewed from the right side of FIG. 1.

FIG. 3 shows an elevation view of the chlorinator of FIG. 1, where the direction of view is from the downstream end of the flow pipe 1, i.e. from the right side of FIG. 1. In FIG. 3 the position of the swivel cover knob 9 is such that the swivel cover 8 in FIG. 1 is in the closed position.

Figure 4:
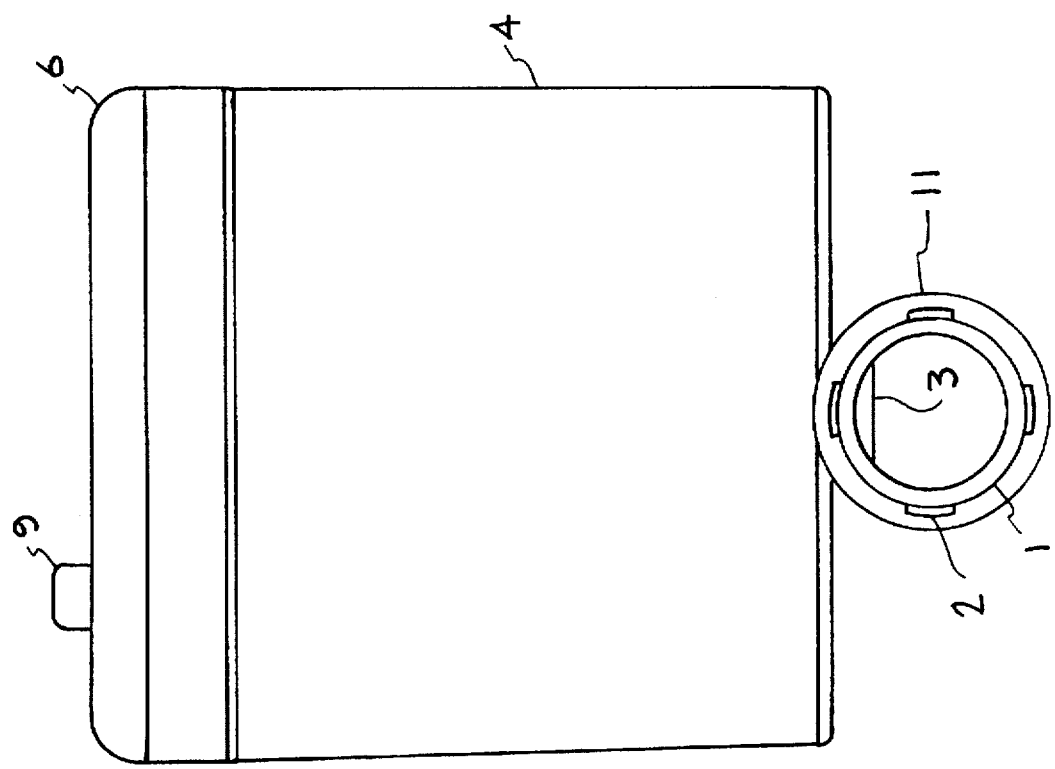
FIG. 4 is an elevation end view of the chlorinator, viewed from the left side of FIG. 1, with the swivel cover for the container lid in a partially open position.

FIG. 4 shows an elevation view of the chlorinator of FIG. 1, where the direction of view is from the upstream end of the flow pipe 1, i.e. from the left side of FIG. 1. In this Figure the position of the swivel cover knob 9 is such that the swivel cover 8 in FIG. 1 is in a partially open position.

FIG. 5 illustrates a perspective view of the chlorinator of FIG. 1. In this drawing the knob 9 and cover 8 are in the fully closed position.

Figure 10:
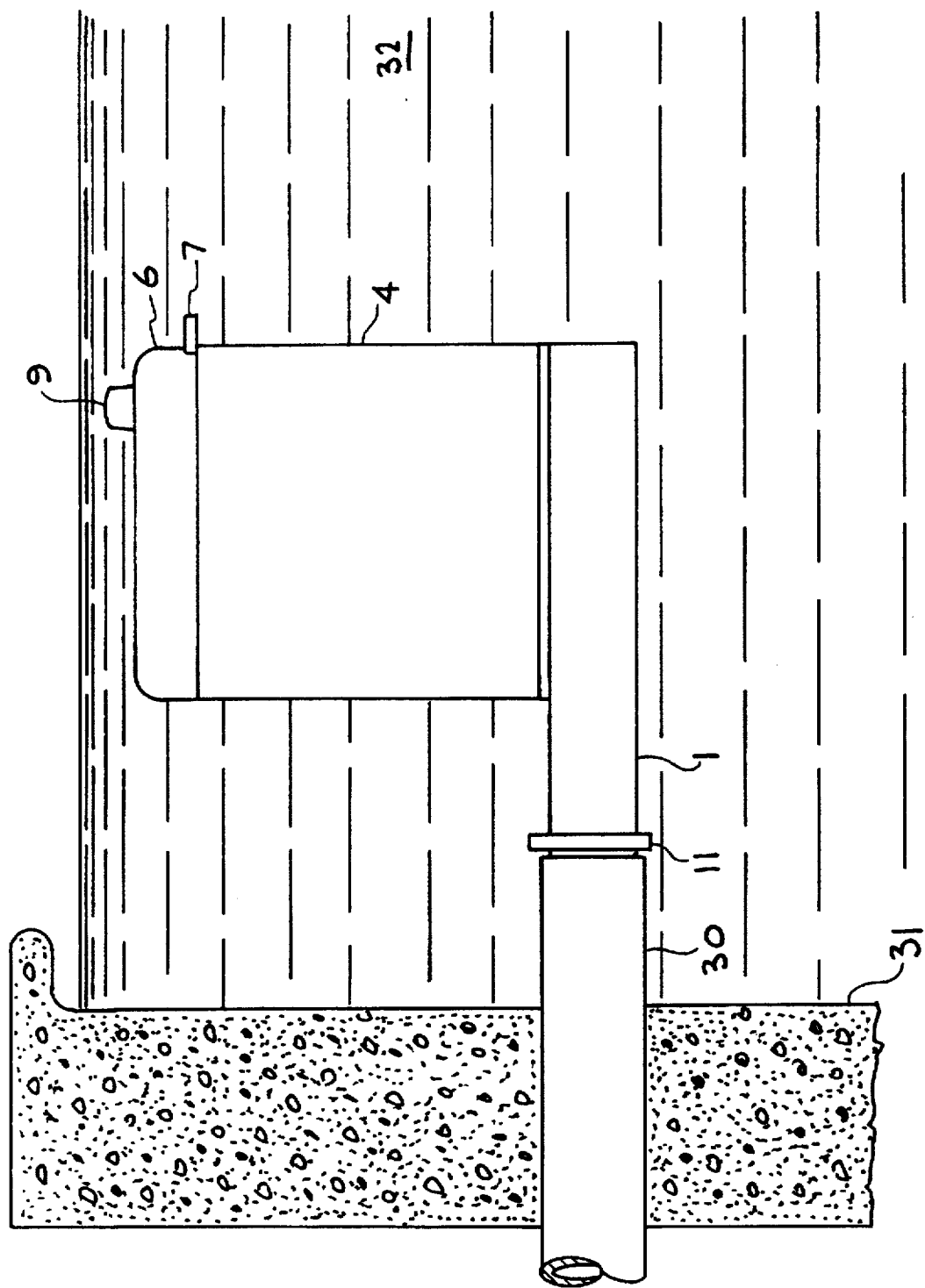
FIG. 10 is an elevation view of the chlorinator illustrated in FIG. 1, immersed in a reservoir and attached to an inlet pipe.

FIG. 10 shows the chlorinator of FIG. 1 in operation as described above, installed in a pool of water 32 and submerged below the water surface. A water inlet pipe 30 extends through the side wall of the pool 31, and the flow pipe 1 is attached to this inlet pipe 30 and communicates with it, such that the inlet water flow passes directly through the chlorinator. Since the chlorinator is completely submerged, water is also drawn into the openings in the chlorinator lid 6.

Figure 7:
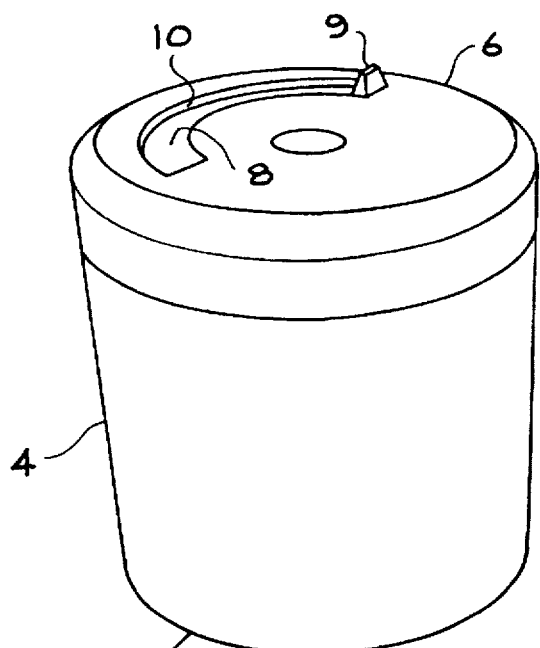
FIG. 7 is a perspective view of a second modified version of the chlorinator shown in FIG. 1.
Figure 8:
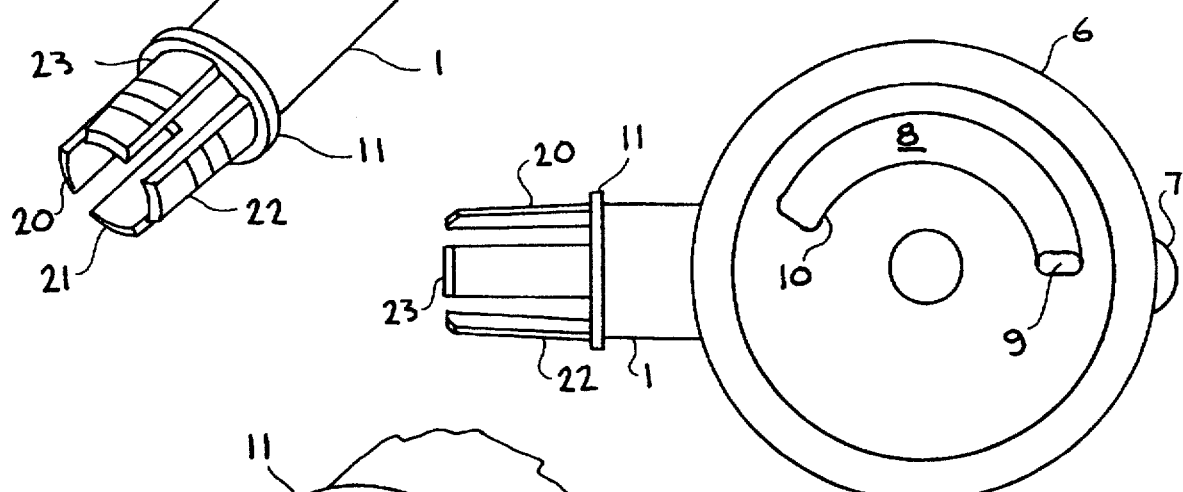
FIG. 8 is a top view of the modified chlorinator shown in FIG. 7.
Figure 9:
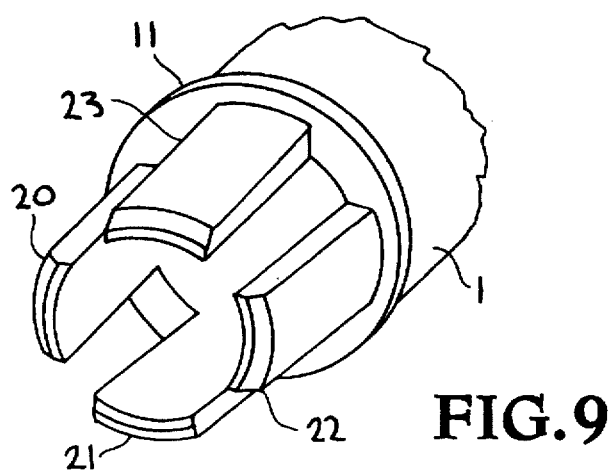
FIG. 9 is a perspective detail view of the inlet end of the flow pipe in the modified chlorinator of FIG. 7.

FIGS. 7, 8, and 9, show another modified version of the chlorinator of the present invention; FIG. 7 is a perspective view of this modified chlorinator, FIG. 8 is a top view of the chlorinator of FIG. 7, and FIG. 9 shows a detail portion of the inlet end of the flow pipe 1 illustrated in FIG. 7. This inlet end of the flow pipe 1 is provided with a plurality of blades, 20, 21, 22, and 23, extending longitudinally in the upstream direction and disposed around the its circumference of the flow pipe 1. The blades 20-23 are tapered slightly inward, i.e. toward the pipe axis, and are slightly flexible. The flow pipe 1 is attached to the water inlet jet pipe by inserting the blades 20-23 into the jet pipe.

Since the blades 20-23 are tapered and flexible, they can be inserted into a jet pipe having a diameter somewhat smaller than the diameter of the flow pipe 1. As the flow pipe 1 is pressed into the water inlet jet pipe, the blades 20-23 bend inward and each blade engages the adjacent blades, to form a strong supporting joint for the chlorinator. The blades may further be provided with ribs, similar to the knurled surface shown in FIG. 1, to increase the friction holding the chlorinator in place. This modified version of the chlorinator has the advantage that it will fit on a variety of water inlet jet pipes having different sizes, without having to obtain special fittings or joints to accommodate pipes of different diameters. The particular embodiment illustrated in FIGS. 7, 8 and 9 has only 4 blades 20-23 for simplicity of illustration. However, it is preferable to include a greater number of blades, each having a smaller width than that shown in these Figures, to accommodate a greater variety of water inlet jet pipe diameters.

The chlorinator described herein is superior to conventional devices in that it is attached directly to the water inlet jet pipe of a pool, and thus utilizes this jet flow to disperse the chlorinated water throughout the pool. It also has the advantage that the chlorinated water is not directly introduced into the water pump, filters, skimmers, or other water circulation system components, and therefore the corrosion and deterioration of these components is minimized. Because of the location and transparency of the chlorine tablet container near the surface of the water, it is easy to see when the tablets must be replenished, and refilling the container is a simple procedure, requiring no tools or special equipment. The entire chlorinator may be removed easily from the water inlet pipe for cleaning and repairing, and reinstalled. The water flow through the container, and the rate of chlorine injection, are easy to regulate, simply by adjusting the size of the water flow opening into the container. The device is simple and inexpensive to construct, and does not include any small water conduits that are subject to clogging or blockage. For a typical pool having a water inlet jet pipe of approximately 1 inch diameter, with a water inlet flow of about 20 gallons per minute, the chlorinator of the present invention disperses chlorinated water at a rate of approximately 1 gallon per minute. When the water inlet jet is turned off, small amounts of chlorine continue to dissolve and diffuse through the pool.

The invention has been described above as a device for producing and distributing chlorinated water in a swimming pool or spa. However, the invention is not limited to this application. Clearly the device may be used to disperse other chemicals in a pool, such as bromine or other disinfectants and algae inhibitors. While the container described above is adapted to receive tablets of solute material, other containers may be use as receptacles for sticks, blocks, pellets or other substance forms within the scope of the invention. The description of the invention has been cast in terms of a chemical dispersal device for pools; however it is clear from this description that the device may be used for other types of fluid reservoirs having a circulation system, or a fluid inlet pipe or conduit. In addition, the invention is not limited to pools or reservoirs of water, as the solvent but may be used to disperse solutes in other solvents.

The foregoing description of the preferred embodiments of the invention has been presented solely for purposes of illustration and description, and is not exhaustive or limited to the precise forms disclosed. Many modifications and variations are possible in light of the above teaching. The spirit and scope of the invention are to be defined by reference to the following claims, along with their full scope of equivalents.

What is claimed is:

1. Apparatus for dispersing solute into a reservoir of solvent having a solvent inlet conduit, said apparatus comprising:

a fluid conduit communicative with said inlet conduit such that solvent flowing into said reservoir passes through said fluid conduit;

container means located above said fluid conduit for containing said solute, said container means having an opening communicative with said reservoir such that solvent can pass from said reservoir into said container means and cause said solute to enter into solution; and a duct connecting said fluid conduit with said container means, such that solvent flowing through said fluid conduit causes said solution to be aspirated from said container means through said duct into said fluid conduit.

2. Apparatus as recited in claim 1, wherein said fluid conduit is removably attached to said inlet conduit.

3. Apparatus as recited in claim 2, wherein said fluid conduit comprises a flow pipe having an inlet end with a knurled surface extending into the interior of said inlet conduit and being in frictional contact with said inlet conduit, such that said flow pipe is removably joined to said inlet conduit.

4. Apparatus as recited in claim 2, wherein said fluid conduit comprises a flow pipe having an inlet end with a plurality of blades extending into the interior of said inlet conduit and being in frictional contact with said inlet conduit, such that said flow pipe is removably joined to said inlet conduit.

5. Apparatus as recited in claim 1, wherein said duct includes a duct portion extending into said fluid conduit such that the flow through said fluid conduit is constricted by said duct portion.

6. Apparatus as recited in claim 5, wherein said duct portion comprises an oblique surface on the upstream side of said duct, such that said solution is aspirated from said container means by means of the Venturi effect.

7. Apparatus as recited in claim 1, wherein said container means are comprised of material that allows the solute contents of said container means to be visible from the exterior of said container means.

8. Apparatus as recited in claim 7, wherein said material is transparent.

9. Apparatus as recited in claim 1, wherein said container means further includes cover means for varying the size of said opening.

10. Apparatus as recited in claim 1, wherein said container means further comprises:

a container having contents comprising said solute, said container further having an open upper portion; and a lid extending over said open upper portion and in contact with said container forming a closed chamber.

11. Apparatus as recited in claim 10, wherein said lid is removably attached to said container.

12. Apparatus as recited in claim 10, wherein said lid further includes a lid opening comprising said opening in said container means, and wherein said container and lid are submerged in said reservoir.

13. Apparatus as recited in claim 12, wherein said container means further includes cover means for varying the size of said lid opening.

14. Apparatus as recited in claim 13, wherein said container means further includes means for holding said cover means to maintain a fixed size of said lid opening.

15. Apparatus as recited in claim 13, wherein said lid opening comprises an elongated slot perforating the surface of said lid, and wherein said cover means comprises a cover member in slidable contact with said lid surface, such that the size of said lid opening is varied by sliding said cover member over said elongated slot.

16. Apparatus as recited in claim 15, wherein said container means further includes means for holding said cover member in a fixed position to maintain a fixed size of said lid opening.

17. Apparatus as recited in claim 15, wherein said cover member comprises a plate, said plate being disposed flush against, and rotatably attached to, said lid surface, such that said rotation of said plate causes said plate to cover varying portions of said lid opening.

18. Apparatus as recited in claim 1, wherein said container means further includes spacer means for holding said solute away from the walls of said container means to allow said solvent from said reservoir to flow freely over the surface of said solute.

* * * * *